United States Patent [19]

Boggum et al.

[11] 4,130,391

[45] Dec. 19, 1978

[54] TANK BLOCK

[75] Inventors: Paul Boggum; Klaus Schulte, both of Wiesbaden, Germany

[73] Assignee: Didier-Werke A.G., Wiesbaden, Germany

[21] Appl. No.: 750,412

[22] Filed: Dec. 14, 1976

[30] Foreign Application Priority Data

Dec. 19, 1975 [DE] Fed. Rep. of Germany ....... 2557242

[51] Int. Cl.² ............................................. F27B 14/06
[52] U.S. Cl. ...................................... 432/264; 13/23; 110/336
[58] Field of Search ............... 65/374 R, 43; 110/1 A; 432/264, 265, 247; 13/6, 23

[56] References Cited

U.S. PATENT DOCUMENTS

| 3,302,352 | 2/1967 | Flexon et al. | 65/374 |
| 3,332,758 | 7/1967 | Firnhaber | 13/6 |
| 3,540,957 | 11/1970 | Bawa et al. | 65/43 |
| 3,767,375 | 10/1973 | Brichard et al. | 65/374 R |

FOREIGN PATENT DOCUMENTS 976991 10/1975 Canada ................................. 65/374 R

OTHER PUBLICATIONS

Refractories, Published Copyright 1949 by General Refractories Comp., 1949 – Phila., Pa. – pp. 34, 35 and 167.

Primary Examiner—John J. Camby
Assistant Examiner—Larry I. Schwartz
Attorney, Agent, or Firm—Wenderoth, Lind & Ponack

[57] ABSTRACT

A tank block has an inner surface facing a glass melt, an outer surface facing away from the melt, an upper or head portion and a lower or base portion. An inner layer is formed of a material which is highly resistant to corrosion by the glass melt. A central layer is formed of a material which is less resistant to corrosion and is joined to the inner layer. An outer insulating layer is firmly joined to the central layer. The tank block is designed so that the inner layer is thickest at those areas most subject to corrosion.

9 Claims, 5 Drawing Figures

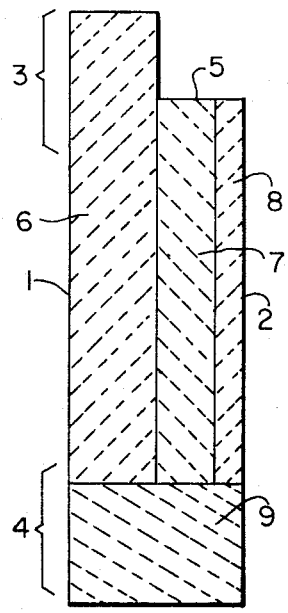 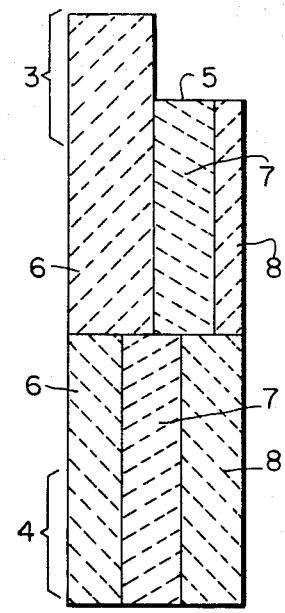 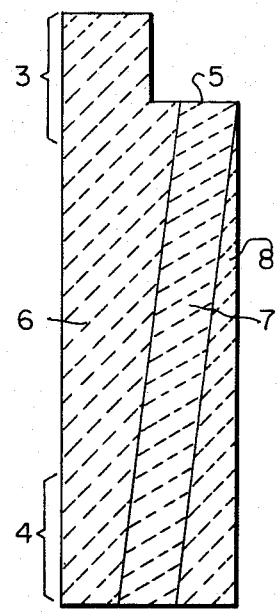
FIG. 1    FIG. 2    FIG. 3
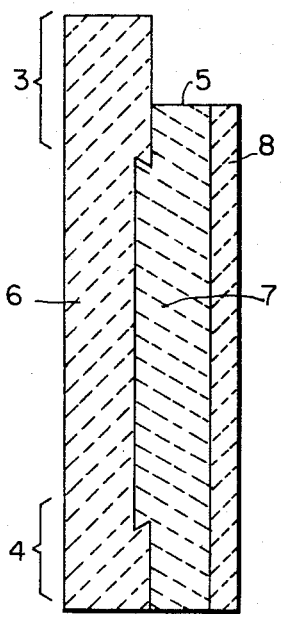 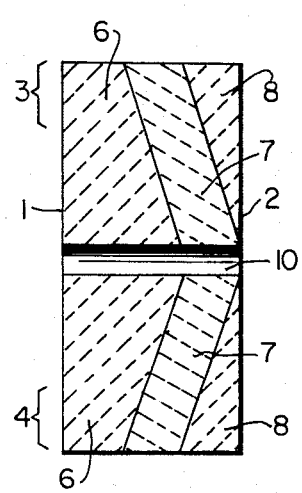
FIG. 4    FIG. 5

TANK BLOCK

BACKGROUND OF THE INVENTION

The present invention relates to a tank block for use in forming the walls of glass-tank furnaces, and of the type having an inner surface which faces the glass bath within the furnace, an opposite outer surface facing away from the bath, a head or upper portion having therein a recess or step facing the outer surface and a base or lower portion.

The present invention further relates to a tank block having a head portion, a base portion and an opening extending through the tank block from the inner surface to the outer surface thereof and employed for the introduction of an electrode.

In glass-tank furnaces, the walls of the tank chamber or basin are lined with large size brick blocks made of high grade and heat resistant ceramic refractory material having a high resistance to corrosion from the glass melt in the furnace, while the joints between the block are as few in number and as small as possible.

The blocks have square or rectangular sides and usually possess dimensions between 1200 × 500 × 300 mm and 500 × 400 × 200 mm. Smaller sized blocks are not normally employed as tank blocks due to the relatively increased number of joints that are involved.

The blocks of the tank basin are attacked by the liquid glass melt during the operation of the tank furnace installation.

The degree of corrosion of the tank blocks by the glass melt is a function of the refractory ceramic material of the blocks, the mineralogical and physical properties of the material of the blocks, the temperature of the glass melt, special conditions with respect to the level of the bath and the temperature drop outwardly through the wall. The strongest corrosion of the tank blocks takes place in the areas of the highest temperature and the highest glass flow. In the case of upper flame heated tank basins, strongest corrosion occurs at the level of the upper surface of the bath, i.e. in the upper or head portions of the tank blocks. In the case of electrically heated installations, strongest corrosion occurs at the area around the point where the electrode extends through the wall into the basin.

In order to reduce the corrosion caused by the glass melt at the level of the bath line or in the area of the electrodes, and to thus equalize the wear profile and to increase the service life of the tank blocks, external air cooling may be provided in the areas of strongest corrosion, especially when the corrosion is already in a highly advanced state. This exterior cooling, in connection with tank blocks that have a step or recess facing the outer surface in the head portion of the tank block, i.e. the so-called recessed or cooling blocks, so as to provide a reduced wall thickness at the level of the bath line, leads to an effective cooling effect. The employment of recessed tank blocks makes it possible to retard progressive corrosive wear of the block in the area of the recess as a result of increased air cooling and also through the use and placement of hot repair bricks, so that the corrosive wear line may be more favorably controlled.

It is also known that in the areas of the tank blocks that are subjected to less corrosion the effect of heat insulation can be achieved by means of bricks or plates without negative effect.

Due to the high requirements placed on the tank blocks, the tank blocks are formed as high-density compact elements based on raw materials that contain alumina, silicic acid and zirconium oxide, in accordance with the following processes: fusion casting, casting of a ceramic suspension and ceramic firing, pressing or compacting a ceramic granular mixture and ceramic firing. Such blocks are very expensive and costly to manufacture. Furthermore, in spite of all efforts to obtain a balanced corrosion wear line, the service life of the recessed tank blocks is substantially determined by the particularly strong corrosion in relatively small zones, namely in the area of the bath level line or in the area of the electrodes. Consequently, large portions of the expensive tank block material, in the areas thereof which are subjected to only low corrosion, are not effectively used, and in fact are wasted.

SUMMARY OF THE INVENTION

Accordingly, the object of the present invention is to reduce and more effectively utilize the expensive high grade corrosion resistant ceramic material, while providing a tank block which still has an effective service life at least as great as known tank blocks.

This object is achieved according to the present invention in that the tank block has, in sequence from the inner surface to the outer surface thereof, an inner brick or ceramic layer which is highly corrosion resistant to the glass melt and which extends in the thickness direction at least to the step in the tank block, a central or intermediate brick or ceramic layer having a lesser resistance to corrosion of the glass melt and an outer insulating brick or ceramic layer. The tank block also may possibly include a brick layer extending entirely from the inner surface to the outer surface, positioned at the lower or base portion of the tank block, i.e. the area less subject to corrosion, and made of a material having a lesser resistance to corrosion. All of the layers are firmly joined to each other.

The inner, central and outer brick layers may also be designated, respectively, as the corrosion layer, the intermediate or safety layer and the insulating layer. As a general rule, when the corrosion of the tank block becomes advanced, the glass melt in the tank basin should not be allowed to directly contact the intermediate layer.

The tank block of the invention makes is possible to more efficiently utilize the expensive refractory materials and thus to manufacture the tank block at a lower cost. Further, it is of essential importance and unexpected that the layered structure of the invention does not lead to a reduction in corrosion resistance and durability of the tank block during operational usage thereof.

When the tank block includes at the base portion thereof, extending from the inner surface to the outer surface thereof, a layer which is relatively less resistant to corrosion, it is possible to obtain more uniform wear of the entire inner surface of the tank block, and it is also more economical to manufacture the tank block.

According to a further feature of the invention, the inner block layer is reduced in thickness by a step between the head portion and the base portion of the tank block. The tank block may be divided in the thickness dimension thereof at the level of this step. Such division simplifies the construction of the tank block.

Further, the inner brick layer can be wedge-shaped with a thickness decreasing from a maximum at the head portion to a minimum at the base portion. The central brick layer in this embodiment has a uniform thickness, and the outer brick layer is wedge-shaped with a thickness increasing from a minimum at the head portion to a maximum at the base portion.

By the above arrangements, more efficient use of the expensive highly corrosion resistant material is achieved, and the temperature drop at the head portion is increased, which advantageously improves durability and ensures the uniform wear of the tank block.

When the tank block has an opening therethrough, extending from the inner surface to the outer surface and employed for the introduction of an electrode, the invention provides that the tank block has an inner brick layer which is highly resistant to corrosion by the glass melt, a central brick layer having a lesser resistance to corrosion and an outer insulating layer, the layers being firmly joined to each other. The inner brick layer is preferably wedge-shaped having a thickness decreasing from a maximum at the opening to a minimum toward both the head and base portions, and also possible toward all sides. The central brick layer preferably has a uniform thickness which extends to the outer surface at the opening. The outer brick layer is wedge-shaped and has a thickness increasing from a minimum at the opening to a maximum toward both the head and base portions, and possibly toward all sides.

This type of tank block also provides for most efficient use of the highly corrosion resistant material at the area subject to the maximum corrosion from the glass melt.

In order to obtain a brick layer that is resistant to the corrosion of the glass melt, the inner brick layer, and also possibly the central brick layer, of the tank block are fired. The inner brick layer advantageously consists of an isostatically pressed or cast shaped layer which is subsequently fired or fused, and which consists of a material based on alumina, silica, zirconium oxide, and possibly chromium oxide. The outer insulating layer, and also possibly the central layer, consists of refractory, chemically or hydraulically bound material.

In order to obtain a firm connection between the brick layers, the brick layers may be joined to each other by a thin layer of refractory, chemically or hydraulically bound material based substantially on $Al_2O_3$, $ZrO_2$, $SiO_2$ with possibly a small amount of $Cr_2O_3$ as an additive and phosphoric acid as a binder.

After the refractory, chemically or hydraulically bound material employed for joining the brick layers is hardened in a known manner, the tank block is strong enough for it to be operable. The composition of the material is selected such that upon sintering at a temperature of approximately 1500° C. it achieves a high degree of denseness and has a high degree of resistance to corrosion by the glass melt. Small fractions of known sintering additives, such as refractory clay or glass powder, may possibly be added to the material.

The material may be formed from a mass having a putty-type consistency and consisting of fine-particled alumina and zirconium, with a small fraction of refractory fire resistant clay, and a binder, such as phosphoric acid, monoaluminum phosphate, chromium acid ($CrO_3$), sodium water glass. The mass is applied to the brick layers, the layers are joined, and the material is dried or hardened at temperatures in the range of between 80° and 120° C.

Due to the formation of the outer layer, and also possibly of the central layer, from a material that is not ceramically fired, the manufacture of the tank blocks is simplified, and the brick layers can be joined without the use of special materials.

The mutually facing surfaces of the brick layers to be joined should be plane, but the texture of the surfaces can be rough, slightly profiled or even ground. The joints between the brick layers, which are filled by a thin layer of refractory material, should not exceed a width in the order of magnitude of 1 mm. The tank block can have joints which come in contact with the glass melt and which are parallel with the bath level or surface. The surfaces of the brick layers defining such joints must be ground, so that the joint filled with a thin layer of refractory material can be kept as narrow as possible. The lateral or side boundary surfaces of the tank block should also be ground, as is customary, in order to ensure that the lining of the glass tank is provided with the narrowest and tightest joints possible.

Furthermore, two of the brick layers, preferably the inner layer and the central layer, can be joined to each other in form-locking manner, for example by use of interlocking dovetail surfaces, and also by other equivalent means, e.g. ceramic dowels.

BRIEF DESCRIPTION OF THE DRAWINGS

The invention will be described in more detail below with reference to several examples thereof, and with reference to the attached drawings, wherein each of the Figures is a longitudinal section through a tank block in a direction perpendicular to the inner surface of the block and to the bath line of the glass melt, and wherein:

FIG. 1 is a section through a tank block having layers of uniform thickness;

FIG. 2 is a section through a tank block having a stepped inner brick layer;

FIG. 3 is a section through a tank block having a wedge-shaped inner brick layer and a central brick layer of uniform thickness;

FIG. 4 is a section through a tank block having an inner layer and a central layer that are joined in form-locking manner; and FIG. 5 is a section through a tank block having an electrode opening therethrough.

DETAILED DESCRIPTION OF THE INVENTION

The tank block of the invention has an inner surface 1 which faces the glass bath, an outer surface 2 facing away from the bath, an upper or head portion 3, a lower or base portion 4 and a step or recess 5 formed in the head portion 3 of the block, at the outer surface thereof. The tank block is formed by an inner brick or ceramic layer 6 which is of a material which is highly resistant to corrosion by the glass melt, a central brick or ceramic layer 7 which is of a material which has a lesser resistance to corrosion by the melt, and an outer insulating brick or ceramic layer 8. The tank block can be formed, at least in a position of the base portion 4 thereof, by a layer 9 extending completely from inner surface 1 to outer surface 2 (FIG. 1). Layer 9 is formed of a material which is less resistant to corrosion by the glass melt than the material of layer 6, since there is less danger of corrosion at the base portion of the tank block.

In the embodiment of FIG. 2, inner brick layer 6 is reduced in thickness by a step at a position between head portion 3 and base portion 4. Layers 6, 7 and 8 of the block are divided at the level of the step. In this embodiment, since there is less danger of corrosion at the lower portion of the tank block, inner layer 6 may be reduced in thickness at such lower portion.

According to an advantageous further feature of the invention, the reduced thickness of inner layer 6 at the lower portion of the tank block can be achieved by providing inner layer 6 as a wedge-shaped layer having a thickness tapering downwardly from a maximum thickness at the head portion. Central layer 7 has a uniform thickness, and outer layer 8 is wedge-shaped and has a relatively small thickness at the head portion of the tank block (FIG. 3).

In all embodiments, the thickness of inner layer 6 at the head portion of the tank block must be sufficient to extend at least to step 5.

The form-lock joining of layers 6 and 7, in accordance with the embodiment of FIG. 4, is achieved by means of complementary mating surfaces of a groove and projection of layers 6 and 7. Inner layer 6 has therein a flat and wide groove between the head and base portions thereof, and central layer 7 has extending therefrom a complementary shaped tongue or projection. Inner layer 6 is stengthened in that the groove ends below head portion 3. Conceivably, the groove could be in intermediate layer 7, and the projection could be on inner layer 6. The tongue and groove engaging surfaces are shown as being dovetail-shaped, however other shaped engaging surfaces could be used.

When the tank block has extending through the thickness thereof an opening for the receipt of an electrode, as shown in FIG. 5, inner layer 6 has a wedge-shaped configuration tapering inwardly from opening 10 both toward head and base portions 3 and 4, and possibly also toward all side edges. Central layer 7 is of uniform thickness and extends to the outer surface 2 of the tank block at the opening 10. Outer layer 8 is wedge-shaped and has a thickness tapering, from opening 10, inwardly toward both head portion 3 and base portion 4.

It is believed from the above discussion that those of ordinary skill in the art will understand compositions of refractory material which may be used to form layer 6, layers 7 and 9, and layer 8. As discussed above, an important feature of the present invention is that the innermost layer 6, at least at the areas of the tank block which are subjected to a high degree of corrosion, be formed of a material which is highly resistant to corrosion by the glass melt. However, a further feature of the present invention is that the remaining layers be formed of a less expensive material. Specifically, layers 7 and 9 may be formed of a corrosion resistant material, but such material is less resistant to corrosion, and therefore less expensive, that the material of innermost layer 6. Layer 8 need merely be of a material which achieves an insulating function.

In the following discussion there will be given examples of specific materials and compositions which may be used to form the various layers of the tank block of the present invention. It is to be understood however that these are exemplary only, and that other known ceramic materials which achieve the same functions as made apparent by the present application may be employed to form the various layers of the tank block.

Inner highly corrosion resistant layer 6 may be formed of any of the fused cast refractory materials known in the art under the quality designations ZAC 1711, ZAC 1681, Yargal M, Monofrax S and Corhart 104.

Layer 6 may be a fired isostatically pressed brick material. For instance, a composition may be formed of calcined alumina having a grain size less than 40 microns, zirconium oxide, zirconium silicate, together with a water-soluble organic binder, in amounts of approximately 2-3 liters/100 kg of dry mixture. This mixture is then isostatically pressed into bricks under a pressure of 150 N/mm$^2$. The bricks are dried and fired at a temperature of approximately 1650° C. for approximately 6 hours. The chemical composition of the resultant bricks forming layer 6 is approximately 50% by weight $Al_2O_3$, approximately 40% by weight $ZrO_2$ and approximately 10% by weight $SiO_2$.

Layer 6 may be a brick material formed of dense fused silicic acid or fused silica. A large compact block of such material may be fused from quartz sand in an electrical resistance furnace. The brick layer 6 then may be sawed out of such block.

The layer 6 may be a brick material formed from comminuted fused quartz substance. A mixture formed of approximately 30% by weight of fused silica having a grain size less than 40 microns and approximately 70% by weight of fused silica having a grain size up to 3 mm is formed into a ceramic slip. The ceramic slip is then cast into bricks in accordance with a known slip casting operation, and then the bricks are dried and fired at approximately 1100° C. to form layers 6.

The central or intermediate layer 7, and also layer 9, may be formed from fired chamotte, or fire-clay, brick. From chamotte, obtained by firing refractory clay, together with approximately 40% by weight alumina and at a grain size of no more than 3 mm, and refractory binder clay in a amount of approximately 10 to 30% by weight, a mixture is produced by the addition of water. This mixture is suitable for the production of bricks by either a stamping or casting operation of known type. These bricks are dried and fired at approximately 1450° C. for approximately 6 hours. The porosity of such chamotte bricks is approximately 15 to 20%. When layers 7 and 9 are made of such a material, they will have a resistance to corrosion by the glass melt. However, this resistance will be less than the resistance of the material of layers 6. Layers 7 and 9 may be manufactured much less expensively than layers 6.

Outer insulating layer 8 may be formed for example from a plastic mixture of chamotte having a grain size of no more than 3 mm, approximately 25% by weight wood powder, which is to be burnt out, at a grain size of no more than approximately 1 mm, approximately 5 to 10% by weight bonding clay, and water in an amount of approximately 10 liters/100 kg of the dry mixture. Bricks may be produced from this plastic mixture by known pressing operations. The bricks are dried, and may then be fired. The firing temperature is maintained initially at approximately 800° C. for a substantial amount of time, for example approximately eight hours. Firing is then continued at a maximum temperature of 1350° C. for approximately six hours. The layer 8 formed in accordance with the above example will perform an insulating function when employed as the outermost layer of the tank block as discussed herein.

Both the central or intermediate layer 7 and the outer or insulating layer 8 may be formed from a material which is hydraulically bound by cement. For example, a mixture may be formed from a refractory porous or bloated chamotte having a grain size of up to approximately 10 mm and approximately 10 to 20% by weight of alumina cement. Bricks to be formed into the central layer 7 and/or the outer layer 8 may be formed from such a mixture by stamping or casting, without firing.

The various layers 6, 7, 8 and 9 may be bound together by a thin layer of refractory material possessing the consistency of a mastic. Such a mastic may be produced from sintered alumina and zirconium silicate in a weight ratio of 1:1, with a grain size of less than 40 microns, together with 4 to 5 liters of 85% phosphoric acid per 100 kg of dry mixture. The mixture may also include approximately 5 to 6% by weight of chromium oxide.

In a particularly preferred manner of bonding together the separate brick layers, and particularly brick layers 6 and 7, adjoining layers are provided with necessary grooves and projections in accordance with the embodiment of FIG. 4. The contact surfaces between the two layers to be joined are ground. The two layers are bound together by filling the cavity formed between the dovetailed surfaces with a mortar produced from a refractory chamotte of approximately 40% by weight alumina and having a grain size of no more than 1 mm, approximately 1 to 5% by weight bonding clay, and 2 to 4 liters of phosphoric acid per 100 kg of dry material.

Various modifications may be made to the above specifically described structural arrangements, without departing from the scope of the present invention.

What is claimed is:

1. A tank block, for use in forming the walls of a glass-tank furnace, and of the type having an inner surface which faces a glass melt within the furnace, an outer surface facing away from the glass melt, an upper or head portion, a lower or base portion, an electrode opening extending from said inner surface to said outer surface, said tank block comprising, in sequence from said inner surface to said outer surface:

an inner layer formed of a material which is highly resistant to corrosion by said glass melt, said inner layer being wedge-shaped and having a thickness decreasing from said opening toward both said head and base portions;

a central layer firmly joined to said inner layer and formed of a material which is less resistant to corrosion by said glass melt than said material of said inner layer; and an outer insulating layer firmly joined to said central layer.

2. A tank block as claimed in claim 1, wherein said central layer has a uniform thickness extending to said outer surface at said opening.

3. A tank block as claimed in claim 2, wherein said outer layer is wedge-shaped and has a thickness increasing from said opening toward both said head and base portions.

4. A tank block as claimed in claim 1, wherein said inner layer is a fired brick.

5. A tank block as claimed in claim 4, wherein said central layer is a fired brick.

6. A tank block as claimed in claim 4, wherein said fired brick comprises an isostatically pressed or cast element formed of a material based on alumina, silica, zirconium oxide and chromium oxide.

7. A tank block as claimed in claim 4, wherein said outer layer comprises a refractory, chemically or hydraulically bound material.

8. A tank block as claimed in claim 7, wherein said central layer comprises a refractory, chemically or hydraulically bound material.

9. A tank block as claimed in claim 1, wherein said layers are joined by a thin layer of refractory, chemically or hydraulically bound material formed from $Al_2O_3$, $ZrO_2$, $SiO_2$, a small quantity of $Cr_2O_3$ as an admixture, and phosphoric acid as a binder.

* * * * *